(12) United States Patent
Denning et al.

(10) Patent No.: US 7,174,480 B1
(45) Date of Patent: Feb. 6, 2007

(54) DATA PROCESSING METHOD AND SYSTEM FOR SIMULATION OF HARDWARE FAULTS UTILIZING A PCI BUS

(75) Inventors: Donald Eugene Denning, Tucson, AZ (US); Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/131,846

(22) Filed: Jul. 24, 1998

(51) Int. Cl.
*G06F 11/00* (2006.01)
(52) U.S. Cl. ...................................................... 714/28
(58) Field of Classification Search ................. 714/43, 714/41, 33, 28, 703; 703/21, 25, 28
See application file for complete search history.

(56) References Cited

U.S. PATENT DOCUMENTS

| | | | |
|---|---|---|---|
| 3,787,670 A | 1/1974 | Nelson et al. | |
| 4,459,693 A | 7/1984 | Prang et al. | |
| 4,703,482 A | 10/1987 | Auger et al. | |
| 4,718,064 A | 1/1988 | Edwards et al. | |
| 4,953,165 A | 8/1990 | Jackson | |
| 5,001,712 A * | 3/1991 | Splett ........................ | 714/703 |
| 5,602,989 A | 2/1997 | Aria | |
| 5,611,057 A | 3/1997 | Pecone et al. | |
| 5,701,409 A * | 12/1997 | Gates ........................... | 714/41 |
| 5,757,811 A * | 5/1998 | Kenmoku ..................... | 714/703 |
| 6,014,504 A * | 1/2000 | Saine .............................. | 716/4 |

FOREIGN PATENT DOCUMENTS

SU 1564628 A * 5/1990

OTHER PUBLICATIONS

"SPD I/O Bus Interactive Test System" IBM Technical Disclosure Bulletin, vol. 32, Issue 1, pp. 56-59, Published Jun. 1, 1989.*
"SPD I/O Bus Error Injector and Detector" IBM Techincal Disclosure Bulletin, vol. 30, Issue 11, pp. 12-15, Published Apr. 1, 1988.*
"Main Store Data ECC Error Injection" IBM Technical Disclosure Bulletin, vol. 30, Issue 10, pp. 217-219, Published Mar. 1, 1988.*
PCI Local Bus Specification, Table of Contents and chapter 4 provided, revision 2.2, Dec. 1998.*

* cited by examiner

*Primary Examiner*—Bryce P. Bonzo
(74) *Attorney, Agent, or Firm*—Dillon & Yudell LLP

(57) ABSTRACT

A data processing system and method are disclosed for simulating a hardware fault occurring on an expansion card coupled to the system utilizing a bus. The hardware fault to simulate is specified. A determination is made of a signal to output utilizing the bus to simulate the hardware fault occurring on the expansion card. The signal is output during operation of the expansion card such that the hardware fault occurring on the expansion card is simulated.

18 Claims, 3 Drawing Sheets

DATA PROCESSING METHOD AND SYSTEM FOR SIMULATION OF HARDWARE FAULTS UTILIZING A PCI BUS

BACKGROUND OF THE INVENTION

1. Field of the Invention

The present invention relates to data processing systems and, in particular, to a data processing system including a PCI bus. Still more particularly, the present invention relates to a method and system in a data processing system for simulating a hardware fault utilizing a PCI bus.

2. Description of the Related Art

Computer architectures generally include a plurality of devices interconnected by one or more various buses. One such bus is a peripheral component interconnect (PCI) local bus. One or more PCI-compliant cards may be installed in a data processing system to expand the system's capabilities.

Known systems exist for detecting existing hardware faults in a computer system. Some systems provide means for detecting and isolating existing hardware faults on PCI cards.

For example, U.S. Pat. No. 5,602,989 describes a means for detecting a hardware fault on a bus by driving signals at one end of the bus, and verifying that the values at the other end match. The means detects existing faults, thus providing verification that a particular bus is either good or bad.

Another example is U.S. Pat. No. 4,459,693 which describes isolating an existing hardware fault after it has been detected. It includes special imbedded circuitry and software to enable and disable devices connected to the same node. In this manner, a faulty component can be isolated and identified.

These known fault detection systems, however, can themselves fail. Because it is not always readily apparent that the fault detection system has failed, faulty components and systems may pass the fault detection tests. When the fault detection system itself fails, testing of components and systems will not be accurate.

Therefore a need exists for a method and system in a data processing system for simulating hardware faults in order to determine whether a fault detection system is operating properly.

SUMMARY OF THE INVENTION

It is therefore one object of the present invention to provide an improved data processing system.

It is another object of the present invention to provide a method and system in a data processing system having a PCI bus.

It is yet another object of the present invention to provide a method and system in a data processing system for simulating a hardware fault utilizing a PCI bus.

The foregoing objects are achieved as is now described. A data processing system and method are disclosed for simulating a hardware fault occurring on an expansion card coupled to the system utilizing a bus. The hardware fault to simulate is specified. A determination is made of a signal to output utilizing the bus to simulate the hardware fault occurring on the expansion card. The signal is output during operation of the expansion card such that the hardware fault occurring on the expansion card is simulated.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
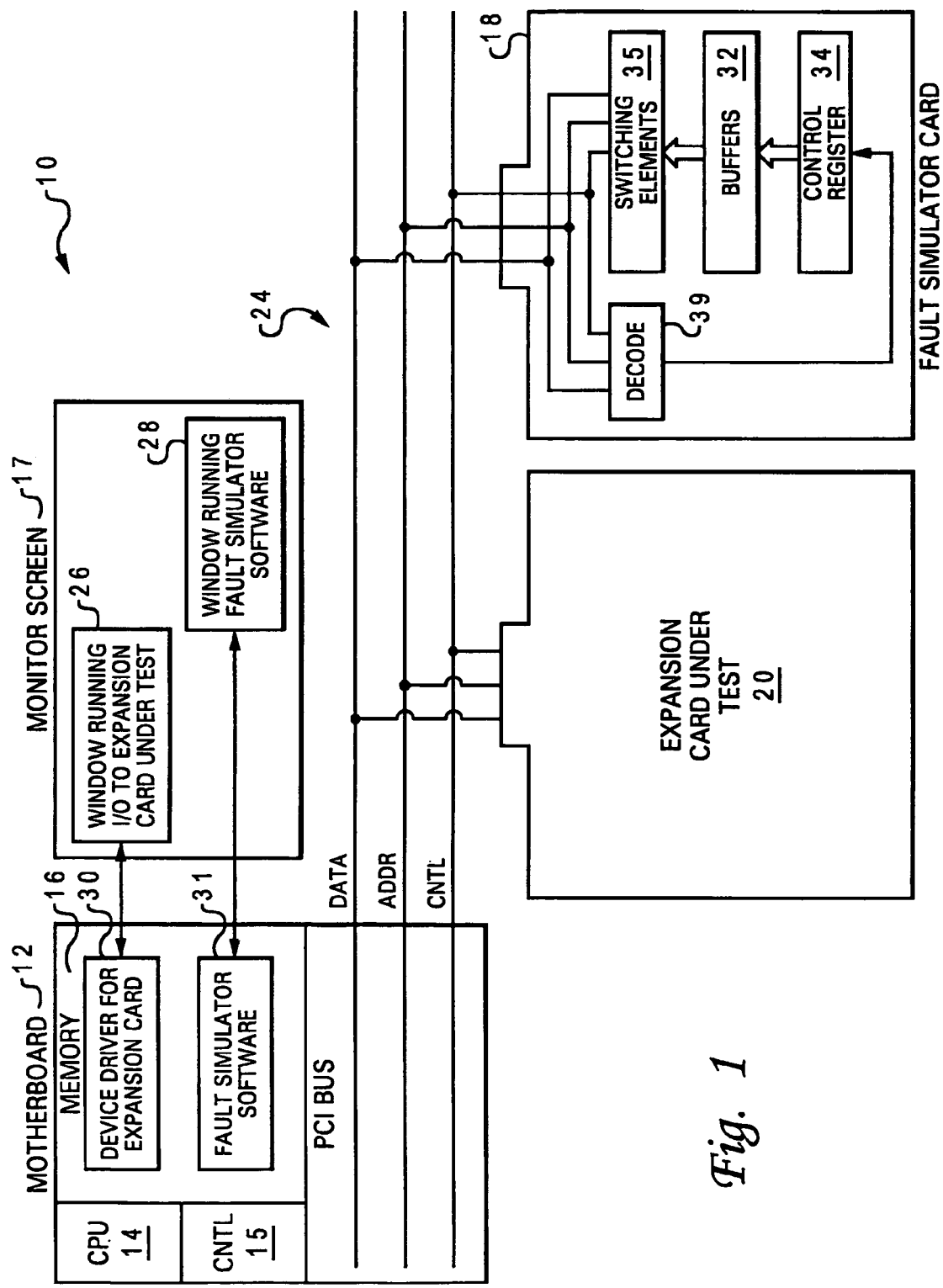
FIG. 1 depicts a block diagram of a data processing system including a fault simulator system embodying the present invention.
Figure 2:
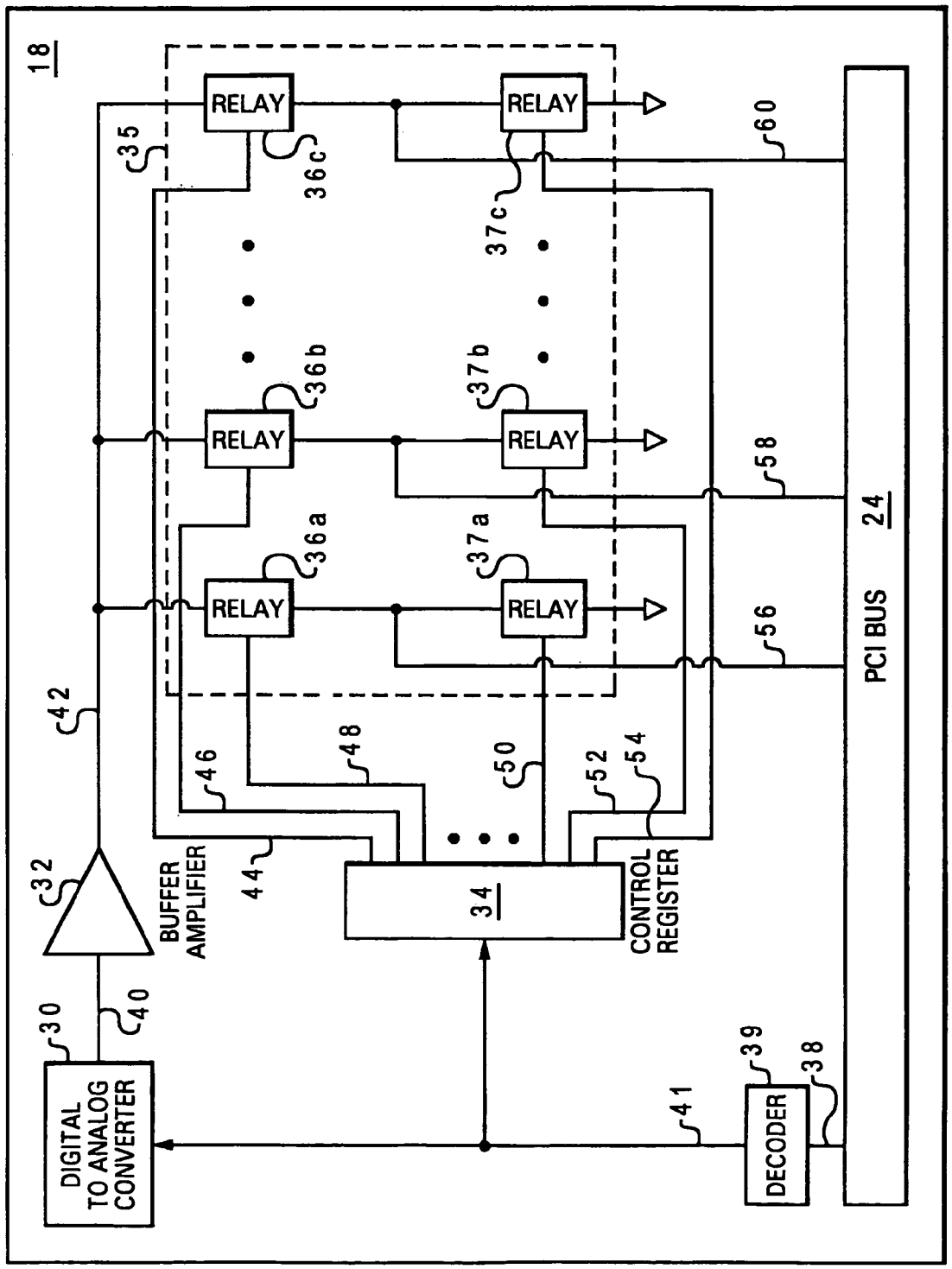
FIG. 2 illustrates a block diagram of a fault simulator card in accordance with the method and system of the present invention.
Figure 3:
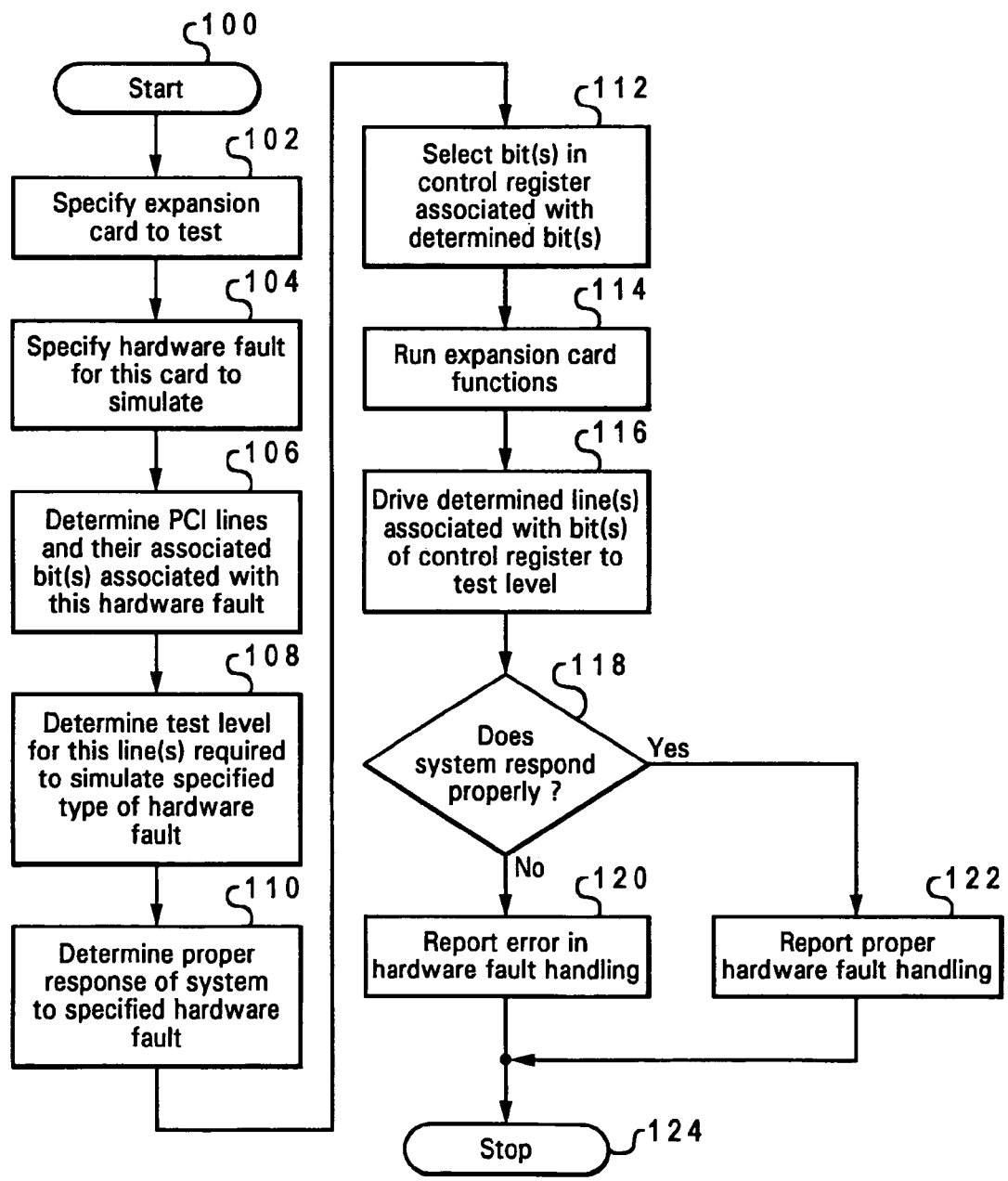
FIG. 3 is a high level flow chart illustrating the simulation of hardware faults and subsequent determination of whether a fault detection system is operating properly in accordance with the method and system of the present invention.

A preferred embodiment of the present invention and its advantages are better understood by referring to FIGS. 1–3 of the drawings, like numerals being used for like and corresponding parts of the accompanying drawings.

The present invention is a method and system for simulating a hardware fault occurring on an expansion card included within the system. The response of the system to the hardware fault can be compared to the known proper fault detection response of the system to that particular hardware fault. In this manner, it can be determined whether the fault detection handling of the system is operating properly.

The present invention includes a fault simulator expansion card which is coupled to the system utilized a bus. In a preferred embodiment, the bus is a PCI bus. The fault simulator card receives a control signal from a processing unit of the system which indicates one of the lines of the bus to utilize during a simulation, as well as the appropriate test voltage level to output on that line.

Each hardware fault for each expansion card is associated with a particular PCI bus line and signal level. In order to simulate a particular hardware fault, it must be determined which PCI bus line is associated with that fault and what voltage level would be present on that line during that fault.

Once the fault simulator card receives the control signal from the processing unit which indicates the PCI bus line and test voltage level, a control register on the fault simulator card is utilized to select a pair of output signals. The output signals are received by a pair of relays to turn one of these relays on and the other off. In addition, a digital-to-analog converter and buffer amplifier are utilized to set the appropriate voltage level. In this manner, any of the PCI bus lines may be driven to any desired test voltage level.

Once the appropriate PCI bus line is driven to the desired test voltage level, the hardware fault is simulated. A comparison can then be made between the actual and proper responses of the system to the hardware fault.

With reference now to the figures and in particular with reference to FIG. 1, there is depicted a block diagram of a data processing system 10 including a fault simulator card 18 embodying the present invention. Data processing system 10 includes a processing unit 12 which includes a CPU 14, control unit 15, and a memory 16, and a display monitor 17. Processing unit 12, fault simulator card 18, and expansion card 20 are coupled together utilizing a PCI bus 24.

Processing unit 12 executes software such as a device driver routine 30 for permitting a user to interface with expansion card 22 via a window 26. Processing unit 12 also executes a fault simulator software routine 31 for permitting a user to interface with fault simulator card 18 via a window 28. Fault simulator card 18 includes buffers 32, control register 34, switching elements 35, and decoder 39.

Data processing system 10 includes a fault detection system known in the art which includes a predetermined, proper response to each type of hardware fault that might be generated by each type of expansion card. The fault detection systems are not the subject of the present invention.

FIG. 2 illustrates a block diagram of fault simulator card 18 in accordance with the method and system of the present invention. Fault simulator 18 includes a digital-to-analog converter 30 (DAC), a buffer amplifier 32, a control register 34, multiple relays 36, and multiple relays 37. Those skilled in the art will recognize that analog switches could be used instead of relays.

DAC 30 and control register 34 both receive as their inputs a control signal 41 which is output by decoder 39. Decoder 39 receives, utilizing PCI bus 24, and decodes a signal 38 from processing unit 12. Control signal 41 includes information regarding which line or lines of PCI bus are to be utilized to test the response of processing unit 12 to a particular hardware fault. Control signal 41 also includes information regarding the test voltage level to be utilized during the simulation.

DAC 30 is utilized to convert the digital information regarding the test voltage level to the proper analog voltage level. DAC 30 outputs an analog signal 40 having a first voltage level to buffer amplifier 32 which amplifies signal 40 and outputs it as test voltage signal 42. Any number of different test voltage levels can be selected and generated utilizing DAC 30 and buffer amplifier 32. Test voltage signal 42 is received by relays 36.

Control register 34 also receives information regarding which line or lines of PCI bus are to be utilized to test the response of processing unit 12 to a particular hardware fault. Control register 34 is utilized to turn selected relays 36 and 37 either on or off. Control register 34 is coupled to relay 36a via signal 48, relay 36b via signal 46, relay 36c via signal 44, relay 37a via signal 50, relay 37b via signal 52, and relay 37c via signal 54. Control register 34 includes a bit associated with each signal output from control register 34 which may be either set or reset to drive the signal either HIGH or LOW.

Each PCI line is coupled to one relay 36 and one relay 37. For example, PCI line 56 is coupled to both relays 36a and 37a. PCI line 58 is coupled to both relays 36b and 37b. And, PCI line 60 is coupled to both relays 36c and 37c.

As an example, when a particular hardware fault cells for PCI line 56 to be driven HIGH, control signal 41 includes information which sets a bit in control register 34 associated with signal 48 to drive signal 48 HIGH, and resets a bit in control register 34 associated with signal 50 to drive signal 50 LOW. Relay 36a is turned on while relay 37a is turned off. This causes the test voltage signal 42 to be output on PCI line 56, thus simulating the selected hardware fault.

FIG. 3 is a high level flow chart illustrating the simulation of hardware faults and subsequent determination of whether a fault detection system is operating properly in accordance with the method and system of the present invention. The process starts as depicted at block 100 and thereafter passes to block 102 which illustrates a specification of a particular expansion card to test. Next, block 104 depicts a specification of a hardware fault for this card to simulate. Any hardware fault could be tested. For example, the fault detection system in processing unit 12 could be tested to determine if it responds properly to a short in a power supply. Block 106, then, illustrates a determination of the PCI line or lines which would be utilized to simulate the hardware fault specified. Each line is associated with one or more bits which must be set or reset in order to simulate the hardware fault.

The process then passes to block 108 which depicts a determination of an appropriate test voltage level for each PCI line which is required in order to simulate the fault. This test voltage level will subsequently be applied to the PCI line. Thereafter, block 110 illustrates a determination of a proper response of processing unit 12 to the specified hardware fault. Next, block 112 depicts a selection of a bit or bits in control register 34 of fault simulator card 18 which are associated with the determined PCI lines utilized for this hardware fault. The process then passes to block 114 which illustrates the running of the functions of expansion card 20 during the simulation.

Next, block 116 depicts the driving of the determined line or lines associated with the determined bit(s) of control register 34 to the determined test voltage level. Thus, a test signal having the determined test voltage level is output utilizing the line(s) of PCI bus 24 during operation of expansion card 20. The test signal overrides any signal output by expansion card 20 onto PCI bus 24 because the test signal is driven at a current level which is higher than the current level expansion card 20 can output. Block 118, then, illustrates a determination of whether or not processing unit 12 responds properly to the hardware fault. If a determination is made that processing unit 12 does not respond properly to the hardware fault, the process passes to block 120 which depicts the reporting of an error in handling of the hardware fault. The process then terminates as depicted at block 124. Referring again to block 118, if a determination is made that processing unit 12 does respond properly to the hardware fault, the process passes to block 122 which depicts the reporting of an error in handling of the hardware fault. The process then terminates as depicted at block 124.

While a preferred embodiment has been particularly shown and described, it will be understood by those skilled in the art that various changes in form and detail may be made therein without departing from the spirit and scope of the present invention.

What is claimed is:

1. A method in a data processing system for simulating a hardware fault occurring on an expansion card, said expansion card coupled to a processing unit in said system utilizing a bus, said method comprising the steps of:
    specifying said hardware fault to simulate;
    determining a signal to output utilizing said bus to simulate said hardware fault occurring on said expansion card;
    creating an analog voltage signal representative of said specified hardware fault utilizing a digital-to-analog voltage converter; and
    outputting said analog voltage signal during operation of said expansion card, wherein said hardware fault occurring on said expansion card is simulated.

2. The method according to claim 1, wherein said step of determining a signal to output utilizing said bus to simulate said hardware fault occurring on said expansion card further comprises the step of determining a signal to output utilizing a PCI bus to simulate said hardware fault occurring on said expansion card.

3. The method according to claim 1, further comprising the step of prior to outputting said analog voltage signal, determining a proper response of said system to said hardware fault.

4. The method according to claim 3, further comprising the step of in response to outputting said analog voltage signal, determining if said system responded properly to said hardware fault.

5. The method according to claim 4, further comprising the step of determining a line of said bus which is associated with said hardware fault.

6. The method according to claim 5, further comprising the step of outputting said analog voltage signal during operation of said expansion card utilizing said line of said bus.

7. The method according to claim 6, further comprising the step of determining a test voltage level for said analog voltage signal, wherein said test voltage level is a voltage level required to simulate said hardware fault.

8. The method according to claim 7, further comprising the step of outputting said analog voltage signal having said test voltage level during operation of said expansion card utilizing said line of said bus.

9. The method according to claim 8, wherein said step of determining a signal to output utilizing said bus to simulate said hardware fault occurring on said expansion card further comprises the step of determining a signal to output utilizing a PCI bus to simulate said hardware fault occurring on said expansion card.

10. A data processing system for simulating a hardware fault occurring on an expansion card, said expansion card coupled to a processing unit in said system utilizing a bus, comprising:

means for specifying said hardware fault to simulate;

means for determining a signal to output utilizing said bus to simulate said hardware fault occurring on said expansion card;

a digital-to-analog voltage converter for creating an analog voltage signal representative of said specified hardware fault; and means for outputting said analog voltage signal during operation of said expansion card, wherein said hardware fault occurring on said expansion card is simulated.

11. The method according to claim 10, wherein said means for determining a signal to output utilizing said bus to simulate said hardware fault occurring on said expansion card further comprises means for determining a signal to output utilizing a PCI bus to simulate said hardware fault occurring on said expansion card.

12. The system according to claim 10, further comprising means prior to outputting said analog voltage signal, for determining a proper response of said system to said hardware fault.

13. The system according to claim 12, further comprising means responsive to outputting said analog voltage signal, for determining if said system responded properly to said hardware fault.

14. The system according to claim 13, further comprising means for determining a line of said bus which is associated with said hardware fault.

15. The system according to claim 14, further comprising means for outputting said analog voltage signal during operation of said expansion card utilizing said line of said bus.

16. The system according to claim 15, further comprising means for determining a test voltage level for said analog voltage signal, wherein said test voltage level is a voltage level required to simulate said hardware fault.

17. The system according to claim 16, further comprising means for outputting said analog voltage signal having said test voltage level during operation of said expansion card utilizing said line of said bus.

18. The system according to claim 17, wherein said means for determining a signal to output utilizing said bus to simulate said hardware fault occurring on said expansion card further comprises means for determining a signal to output utilizing a PCI bus to simulate said hardware fault occurring on said expansion card.

* * * * *